Oct. 21, 1952 D. M. WHITNEY 2,615,105
HYDRAULIC BRAKE MASTER CYLINDER RESERVOIR FLOAT SWITCH
Filed Feb. 21, 1949

David M. Whitney
Inventor
By [signature]
Atty.

Patented Oct. 21, 1952

2,615,105

UNITED STATES PATENT OFFICE 2,615,105

HYDRAULIC BRAKE MASTER CYLINDER RESERVOIR FLOAT SWITCH

David M. Whitney, Toledo, Ohio

Application February 21, 1949, Serial No. 77,602

3 Claims. (Cl. 200—84)

This invention relates to signalling critical subsidence in power liquid control system, primarily from manual direction of the liquid in the system, with automatic independent actuation of the signal by the liquid.

This invention has utility when incorporated as a readily substitutive accessory for the filling plug at the master cylinder in a hydraulic brake system, say of the four wheel type for motor vehicles. Normally the master cylinder is provided with a power fluid reserve reservoir thereover, coacting as a replenishing means for the system. Besides oozing back and forth between the master cylinder and the reserve chamber therefor to cause the liquid level in the reservoir to change in the normal operation, there is in addition thereto, considerable disturbance for the less than full reservoir due to vehicle travel, stopping and starting. In place of the vented refilling plug or closure for the reservoir, there is herein provided an electric switch, or check, with its operating means of float type, shielded from vehicle lunges, and providing a stable control coacting at lowered power liquid level toward depletion of the reserve, to give a signal, say a light at the dash, so that the driver of the car is warned timely as to brake operation impending failure.

Referring to the drawings.

Figure 1:
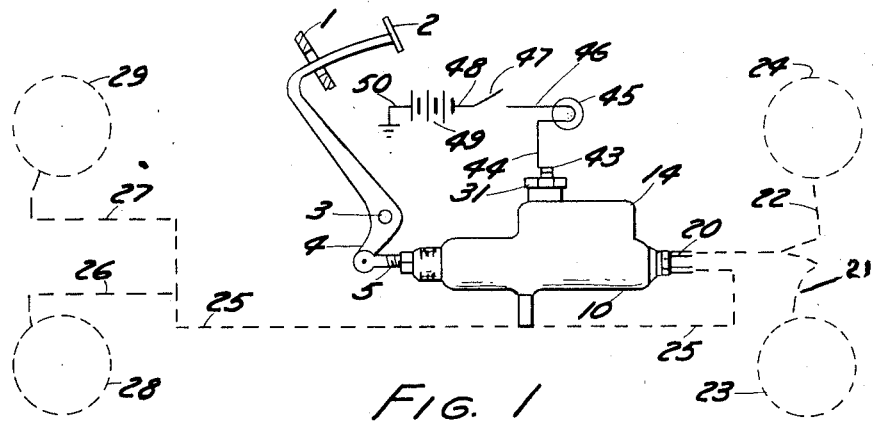
Fig. 1 is a side elevation of a master cylinder and brake pedal operator therefor, with wiring for a signal circuit, and dotted line showing of the four wheel brake ducts for the hydraulic brake system.
Figure 3:
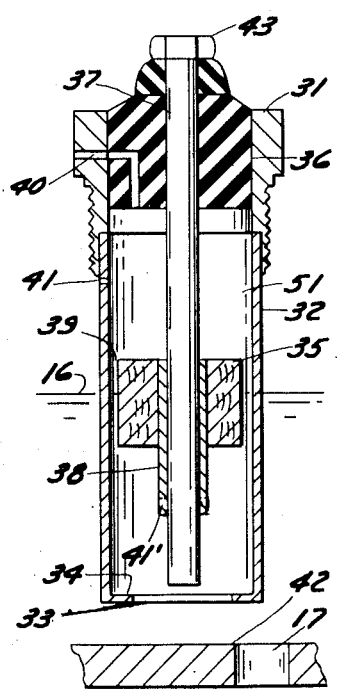
Fig. 3 is a vertical section, on a somewhat larger scale of the accessory switch providing plug terminal at open position for the switch.
Figure 2:
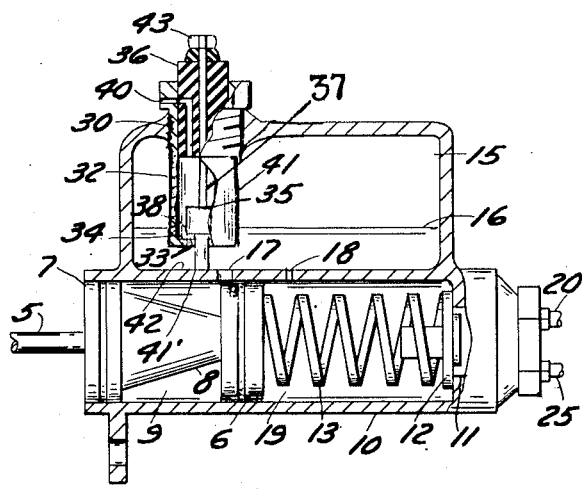
Fig. 2 is an enlarged view, with parts broken away of the master cylinder of Fig. 1, in switch closing position.

A motor vehicle 1 is provided with a brake pedal 2 having a fixed fulcrum 3. From the pedal 2 and fixed therewith is a short arm 4 beyond the fulcrum 3. The arm 4 is pivotally connected to a piston rod 5 extending into a trunk piston having a forward packed end 6 and a follower packed end 7 with a tapered connecting portion 8 having a chamber 9 thereabout between the piston end portions 6, 7.

The piston 6, 7, is slidable in a cylinder 10 having an open or discharge end 11 remote from the piston 6, 7. A seat 12 in the cylinder 10 adjacent the open end 11, is engaged by a helical compression spring 13 extending to the piston 6, 7, and firmly holding the piston 6, 7, against the plunger type of piston rod 5.

A housing 14 for the cylinder 10 has an upward extension providing a chamber or reservoir 15 for a reserve supply 16 of power liquid for the hydraulic brake system. At non-depressed position for the brake pedal 2, the piston end 6 leaves a port 17 in the bottom of the reservoir 15 in communication with the chamber 9. A somewhat smaller, seepage or by-pass port 18 connects the bottom of the reservoir 15 with a chamber 19 in which is located the spring 13.

The driver of the vehicle 1, as occasion arises for applying brakes or stopping the automobile, may use his foot to depress the pedal 2. The spring 13 is compressed, and the piston end 6 rides along in the chamber 19 of the cylinder 10 past the port 18. The power liquid in the chamber 19, as fully charged, is thereby forced therefrom thru the end 11 by duct 20 and thru branches 21, 22, to hydraulic brake cylinders at rear wheels 23, 24. In parallel with the duct 20 from the end 11, is a duct 25 extending forwardly to branches 26, 27, connected respectively to hydraulic brake cylinders in forward vehicle wheels 28, 29. The reservoir 15 has an internally threaded, charging or refilling opening 30 in its top for replenishing power liquid supply.

Under the invention herein, an automatic electric switch or float-controlled contact is adopted instead of a normal closure plug at the replenishing opening 30. To this end there is provided a hollow plug or reducing bushing 31. Brazed or welded thereto is a concentric sleeve or extension 32 having a lower open end 33 bounded by a slight inward flange 34 sufficient to preclude dropping clear thereof for a float 35.

An insulation filler 36 for the plug 31 has centrally therein a conductor stem or rod 37, preferably extending slightly short of to the flange 34. Fixed with the float 35 is a tubular guide or switch contact 38 having sliding electrical connection with the rod 37 at all times. It is desirable that the float 35 be not an electrical conductor, especially at the portion thereof to strike the flange 34, or that the sleeve 32 be of non-conducting body. The guide 38 maintains the float 35 for annular clearance 39 relative to the inside of the sleeve 32. Outward from the chamber 15, there is a small vent opening 40 past the insulation 36 and thru the plug 31. Supplemental thereto, there is a port 41 of sufficiently small diameter to allow a relatively slow rate of liquid outflow from within the sleeve 32, as in operation such excess may be lodged above the float 35 or pumped thereto by way of the clearance 39. This means that there may arise dashpot operation from sudden changes in liquid level in the reservoir 15, and that it establishes no quick throws or spasmodic operations, but the float has a retarded or stable functioning. It follows that from this effective control, so long as the mean liquid level upper surface for the power liquid 16 in the reservoir sufficiently sustains the float 35 that contact end 41' for the guide 33 is away from bottom wall 42 of the reservoir 15, this automatic switch is open. In normal practice, thrusting of the pedal 2 to effect application of the brakes at the wheels 23, 24, 28, 29, may give an oscillation disturbance of as much as ⅜".

The electric circuit

The contact rod 37 has a terminal or head 43 upward from the insulation 36. To this may be attached a spark-plug type of clip with a conductor line 44 to a signal, herein shown as a light 45, readily visible to the vehicle driver, say for such to be located on or adjacent to the instrument panel or dash region.

From the visible signal 45 a line 46 extends to the ignition switch 47. By this provision, at any condition of power fluid depletion, before replenishment has occurred, the standing car at out-of-service condition, is not experiencing running down of its battery, for at such times the ignition switch 47 is normally open. The circuit from the ignition switch 47 is by a line 48 to a battery 49 having a ground 50, common to the ground 42 as the bottom wall of the power fluid carrying chamber 15, or even a contact in the sleeve.

In operation of the vehicle, there is normally considerable swishing of the upper surface of the power liquid 16 in the reservoir 15. This somewhat wide range in the top surface condition for the power liquid, is materially stabilized before effective to disturb the automatic switch, which has its float 35 shielded by the sleeve 32. Furthermore, any bobbing freely of the float 35 does not take place, for above the float 35 is a dashpot chamber 51. The small cross-section of the vent duct 40 is primarily to allow sufficient air to enter the chamber 15 above the level of the power liquid 16 so that in the normal brake operation as effected from the pedal 2, the power liquid is released for entrance to the chambers 9, 19, by the ports 17, 18, to keep the master cylinder 10 replenished. Also, with the vent 40 from the chamber 15, there may be backflow into the chamber 15, say as there may be excess flow to the cylinder 10, or to compensate for fluid expansion from temperature change or rise. More sluggish than air, liquid as pumped or above the float 35 coacts as a dashpot in its flow, with possibly some air thru the port 41, which also may relieve the chamber 51 from holding the float 35 from properly settling to the actual liquid telltale therefor.

Normally with the motor vehicle idle and accordingly not set for the internal combustion engine or motor to function, the first action to be taken by the chauffeur or driver is to cut in the ignition switch 47 so that the motor may operate. The brake pedal 2 is at released position. From driving there is stopping or vehicle holding from rolling, effected by the operation of the brake pedal 2 to shift the piston 6, 7, in the master cylinder 10. The inward travel of the piston rod 5 as to the cylinder 10 delivers fluid pressure thru the ducts 20, 25, to the respective brake band controls at the several wheels of the vehicle. There are various joints thruout the system, as well as for the piston 6, 7, as to the cylinder 10. The dissipation of the control volume for the liquid is almost negligible with the installation in good order. However, there is always some depletion and as such reserve volume becomes so low in the reservoir 15 that there is not replenishment excess for the cylinder 10, there is hazard of possible defective brake functioning in a stop emergency. Under the invention herein, as the reservoir 15 is not quite exhausted of reserve liquid, the low level of such liquid 16 is not sufficient to hold the float 35 poised and it settles down for its sleeve 41' to strike the top side of the cylinder 10 for a ground 42 in completing a circuit now past the closed ignition switch 47, thru the line 46, the signal 43, the line 44, to the rod 43, the guide 48, now performing as an automatic switch in contacting the ground 42, the ground 50, the energy source 49, and the line 48 to the opposite side of the switch 47. It is thus seen that the automatic signal circuit is only in during the ignition circuit being on and in parallel therewith to a common ground. Upon replenishing liquid in the chamber 15 by removing the plug 31 and thereafter replacing the plug, there is now sufficient liquid in the reservoir 15 to keep the float 35 poised during the operation of the piston in the cylinder 10.

What is claimed and it is desired to secure by Letters Patent is:

1. A brake fluid level warning device adapted for attachment to a master cylinder reservoir and functioning to operate an electrical signal on a vehicle, said device comprising a hollow plug having an externally threaded portion for screwing said threaded portion into and out of the reservoir, a cylindrical float operable by change of level of the fluid in the reservoir, there being a cylindrical guide in which the float operates, said cylindrical guide extending downwardly from said plug into the reservoir and normally into the fluid to coact with said float to retard its operation, an electrically conducting guide rod axial of said plug extending above said plug to an electrical terminal and extending into the reservoir short of the extension of said cylindrical guide, an electrical insulation ring supporting said guide rod in said plug and closing the hollow space in said plug, electrical conducting means fixed with and vertically extending away from said float, adapted for closing a circuit with said guide rod when said float is at a critical level for the fluid in the reservoir.

2. In a brake fluid level warning device for an electrical-ignition-equipped vehicle having in a series circuit a signal and an ignition switch, said device being adapted for attachment to a master cylinder reservoir in place of the filling plug for said reservoir, said device including a cylinder mountable to extend downwardly into the reservoir which reservoir coacts for one side of an electrical circuit, an insulation filler providing a closure for the top end of the cylinder, a contact rod mounted in the filler to be thereby insulated from the reservoir, said rod extending downwardly from the filler into the cylinder, and a float in the cylinder, said float having guide means adapted to slidably coact between the float and rod in directing up and down shifting of the float in the cylinder relatively to the rod, said guide means at a down limit of the float shifting having a portion coacting between the rod and reservoir to form a closed switch to bypass the insulation filler.

3. In a brake fluid level warning self-contained-dashpot device for an electrical-ignition-equipped vehicle having in a series circuit a signal and an ignition switch, said device being adapted as assembled therewith to coact as a filler plug for a master cylinder reservoir, said device including a dashpot cylinder mountable to extend downwardly into the reservoir, which reservoir coacts for one side of an electrical circuit, an insulation filler providing a closure for the top end of the cylinder, a contact rod mounted in the filler and thereby insulated from the reservoir, said rod extending downwardly from the filler into the cylinder, a dashpot piston float in the cylinder, said float having guide means adapted to shiftably coact between the float and rod in directing up and down movement of the float in the cylinder relatively to the rod, there being dashpot operation dampening means including a vent from the cylinder at the filler, at a down limit position for the float said guide means having a portion coacting between the rod and reservoir to form a closed switch to bypass the insulation filler.

DAVID M. WHITNEY.

REFERENCES CITED

The following references are of record in the file of this patent:

UNITED STATES PATENTS

| Number | Name | Date |
|---|---|---|
| 2,161,441 | Vickers | June 6, 1939 |
| 2,253,260 | Alcorn | Aug. 19, 1941 |
| 2,479,503 | Moore | Aug. 16, 1949 |
| 2,494,802 | Fox | Jan. 17, 1950 |